United States Patent
Weyandt et al.

(10) Patent No.: US 6,358,006 B1
(45) Date of Patent: Mar. 19, 2002

(54) QUICK DISCONNECT BRACKET SYSTEM FOR PROPELLER DEICER

(76) Inventors: Scott Edward Weyandt, 90 Merriman Rd., Apt. 2, Akron, OH (US) 44303; Gary Gene Garcia, 12264 Pueblo Pass, Uniontown, OH (US) 44685

( * ) Notice: Subject to any disclaimer, the term of this patent is extended or adjusted under 35 U.S.C. 154(b) by 0 days.

(21) Appl. No.: 09/420,823

(22) Filed: Oct. 19, 1999

(51) Int. Cl.⁷ ................................................. B63H 3/00
(52) U.S. Cl. ........................................ 416/39; 416/95
(58) Field of Search .............................. 416/30, 39, 95, 416/1; 244/134 D, 134 R; 24/17 R, 16 PB

(56) References Cited

U.S. PATENT DOCUMENTS

| | | | |
|---|---|---|---|
| 3,022,557 A | * 2/1962 | Logan | 24/17 R |
| 3,149,808 A | * 9/1964 | Weckesser | 24/16 PB |
| 4,779,828 A | * 10/1988 | Munch | 24/16 PB |
| 5,020,741 A | 6/1991 | Ziegler et al. | 244/134 |
| 5,174,717 A | 12/1992 | Moore | 416/39 |
| 5,709,532 A | 1/1998 | Giamati et al. | 416/39 |

* cited by examiner

*Primary Examiner*—Edward K. Look
*Assistant Examiner*—Richard Woo

(57) ABSTRACT

A wiring system for an electrothermal propeller deicer for both left and right hand rotating propellers, where the deicer has leads extending therefrom and terminating in a connector which mates with a connector connecting leads from the power supply. The mated connectors are secured in a support bracket attached to the propeller blade hub using an adjustable, flexible, self connecting strap which can be removed without removing the support bracket during deicer replacement.

18 Claims, 7 Drawing Sheets

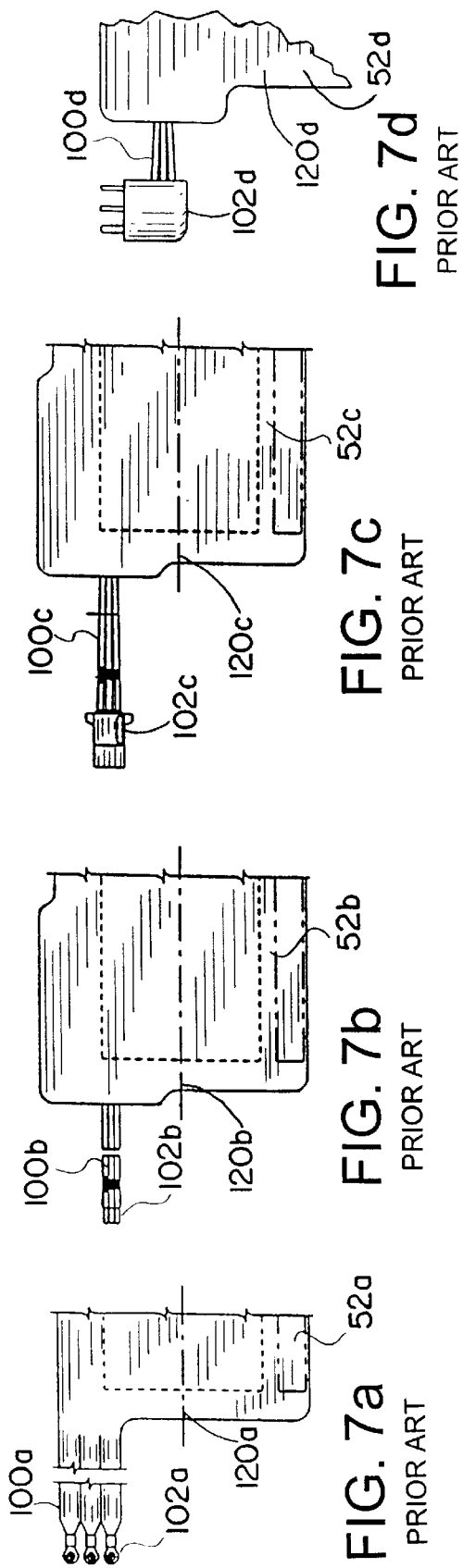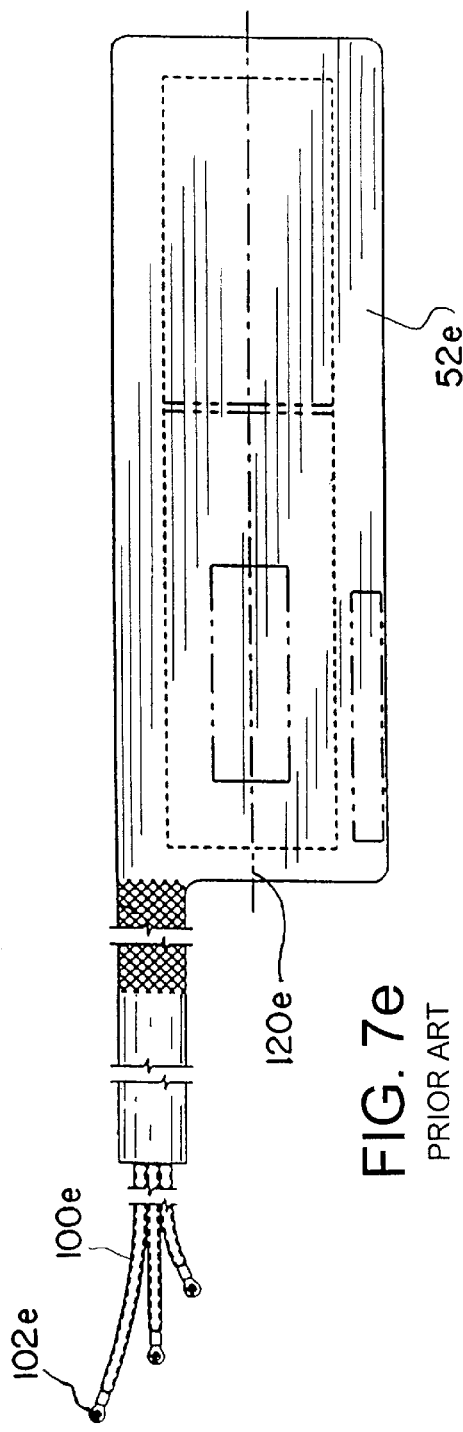

QUICK DISCONNECT BRACKET SYSTEM FOR PROPELLER DEICER

TECHNICAL FIELD

This invention is related to electrothermal propeller deicers, and more particularly, an electrothermal deicer assembly having a wiring harness and mounting hardware for use with such a propeller deicer.

BACKGROUND OF THE INVENTION

The hazards of aircraft flight in atmospheric icing conditions are well known. Through the years, various workers in the art have developed various techniques for removing or preventing ice accumulation encountered during flight. Certain techniques are particularly adapted to protect specific parts of an aircraft. An electrothermal propeller deicing system is an example of a specialized system.

In an electrothermal propeller deicing system, electrothermal deicers are bonded to the inboard leading edge portions of the individual blades of an aircraft propeller. An example of an electrothermal propeller deicer is presented in U.S. Pat. No. 4,386,749 to Sweet. Electrical power is supplied to the individual deicers through flexible wire harnesses that act as jumpers between each blade and the propeller bulkhead. The harnesses must be flexible since each blade must be able to rotate about its axis in order to effectuate pitch changes. An example of a wire harness is presented in U.S. Pat. No. 5,020,741 to Ziegler et al.

Electrical power is conducted to the propeller ice protection system through a sliding contact comprising a slip ring assembly and a brush assembly. A typical arrangement is presented in U.S. Pat. No. 4,136,295, to Sweet.

It is also well known in the art that environmental issues cause various types of failures for the electrical resistance deicer heater as well as the wiring harness used to energize that heater. Because of the exposure of the deicer system to such environmental conditions as rain, sand, dust, birds, extreme temperatures, etc., it is essential that the deicer be easily replaceable while being firmly secured in a facile manner to the propeller blade assembly in order for the blade to rotate about its axis. One attempt to improve a propeller deicer wiring harness system is disclosed in U.S. Pat. No. 5,174,717 to Moore.

Efforts regarding such deicer systems have led to continuing developments to improve their versatility, practicality and efficiency.

OBJECTS OF THE INVENTION

It is a primary of the present invention to provide a low cost, durable, and easily installed wiring harness and connection system for use with aircraft propeller electrical resistance deicer units.

It is also an object of the present invention to provide a harness assembly which significantly reduces the amount of time required for the removal of an old deicer unit and installation of a new deicer unit while at the same time reducing the level of skill required for the installer.

It is further and object of the present invention to minimize the requirement for parts and pieces for the assembly, such as nuts, bolts, cable clamps and the like which increase the costs and time required for the assembly.

It is still further an object of the present invention to provide an electrical propeller deicer assembly which has common parts for utilization on propellers for blade revolution in either the clockwise or counterclockwise engine drive direction.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

SUMMARY OF THE INVENTION

According to the present invention, a system for electrically connecting deicer leads extending from an electrical resistance heater propeller blade deicer to source leads connected to an electrical power source, the propeller being mounted on a hub, the system having: (a) a first connector having separate electrical terminals for each of the deicer leads;(b) a second connector having separate electrical terminals for each of the source leads, wherein the first and second connectors are mated together to form a mated connection to provide electrical power to the deicer;(c) a support bracket having: a tongue for attachment to the hub; projections configured to define a carriage portion for receiving the mated connection and limiting movement thereof; and an aperture provided in the support bracket; and, (d) a first flexible strap having an adjustable, tightening, locking mechanism, wherein the flexible strap is inserted through the aperture, around the mated connection, tightened and locked to secure the mated connection in position on the hub relative to the deicer, the flexible strap being removable to permit disassembly of the connector members and to permit replacement of the deicer or deicer source leads.

The present invention provides an easily replaceable connect system which is retrofitable to existing electrical heater deicers, is inexpensive and reduces electrical heater replacement times by a significant amount. It allows simplified installation and removal of system and eliminates the need to disengage brackets when servicing the deicer heating element or wire harness. The new bracket also allows for multi-positioning of the propeller blade balance weights and allows for usage of a single deicer and hardware assembly for utilization on propellers which revolve in either the clockwise or counterclockwise direction.

BRIEF DESCRIPTION OF THE DRAWINGS

FIGS. 7a–7e are partial plan views showing the terminals and part of the body of a typical propeller deicer used with the prior art structure of FIGS. 1–6.

DETAILED DESCRIPTION

Figure 1:
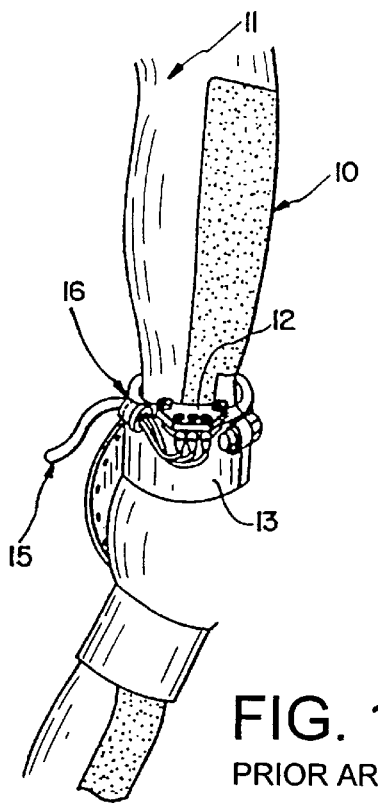
FIG. 1 is a partial perspective view of a propeller having a prior art terminal assembly for establishing connection to a propeller deicer.
Figure 2:
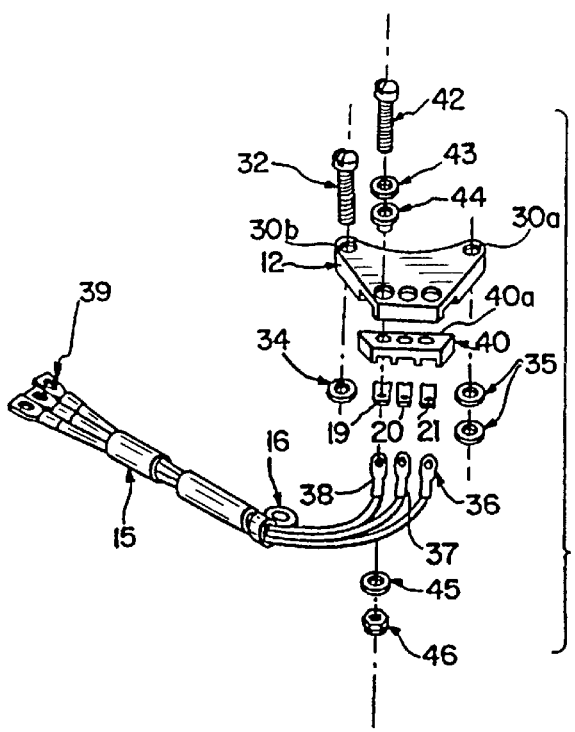
FIG. 2 is an exploded perspective view of the prior art connector assembly shown in FIG. 1.
Figure 3:
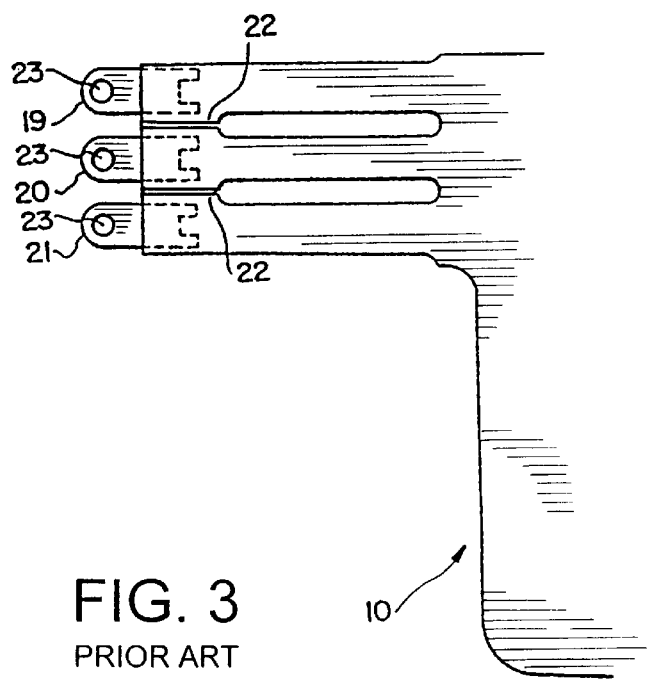
FIG. 3 is a partial plan view showing the terminals and part of the body of a typical propeller deicer used with the prior art structure of FIGS. 1 and 2.

Before commencing a detailed description of the preferred embodiment of the present invention, it is believed essential to make detailed reference to the prior art, particularly FIGS. 1–7e. FIG. 1 shows a portion of a propeller blade having a deicer 10 affixed to the blade 11 (partially shown), deicer 10 being affixed in any suitable manner and electrical connections being made at the bracket 12 which is secured to the conventional collar 13 of propeller blade 11. The leads extending to the aircraft power supply are partially shown and generally designated 15, the cable leads being held in place on the collar 13 with a suitable clamp fastener 16. FIG. 3 shows the terminal end (only) of deicer 11 and, as indicated, three separate terminals 19, 20 and 21 connect to the resistance heater (not shown) within the deicer 10. The terminals 19, 20 and 21 are provided with separations 22 to permit the desired flexibility and each such terminal is provided with a mounting aperture 23.

Turning next to the details of the mounting bracket 12 shown in FIG. 2, it is seen that the basic bracket structure is provided with end apertures 30a and 30b through which extend suitable mounting fasteners 32 (only one of which is shown) which engage cooperating threaded apertures in collar 13, spacer washers 34 and 35 being provided to complete the mounting arrangement.

In order to effect connection of the terminals 19, 20 and 21 to the terminals 36, 37 and 38 of the cable harness 15 which extends through terminals 39 to the power supply, an insulating block 40 is provided with apertures 40a in alignment with the apertures 41 of the mounting bracket. Fasteners 42 (only one of which is shown) extend through a washer 43 and an insulating bushing 44 thereafter through insulating block 40, the deicer terminals 19, 20 and 21 to electrically engage the terminals 36, 37 and 38, the connection being secured by the washer 45 and the threaded fastener 46. For completeness, it is noted that the clamp 16 for securing the cable 15 in position is attached to the bracket by any suitable fastener arrangement, (not shown).

Figure 4:
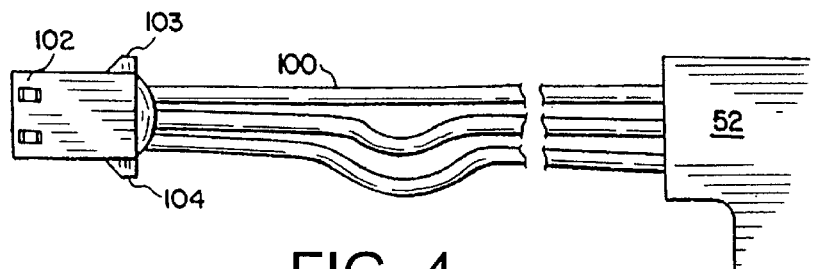
FIG. 4 is a partial plan view of a propeller deicer provided with a prior art terminal assembly for establishing connection to a propeller deicer.
Figure 5:
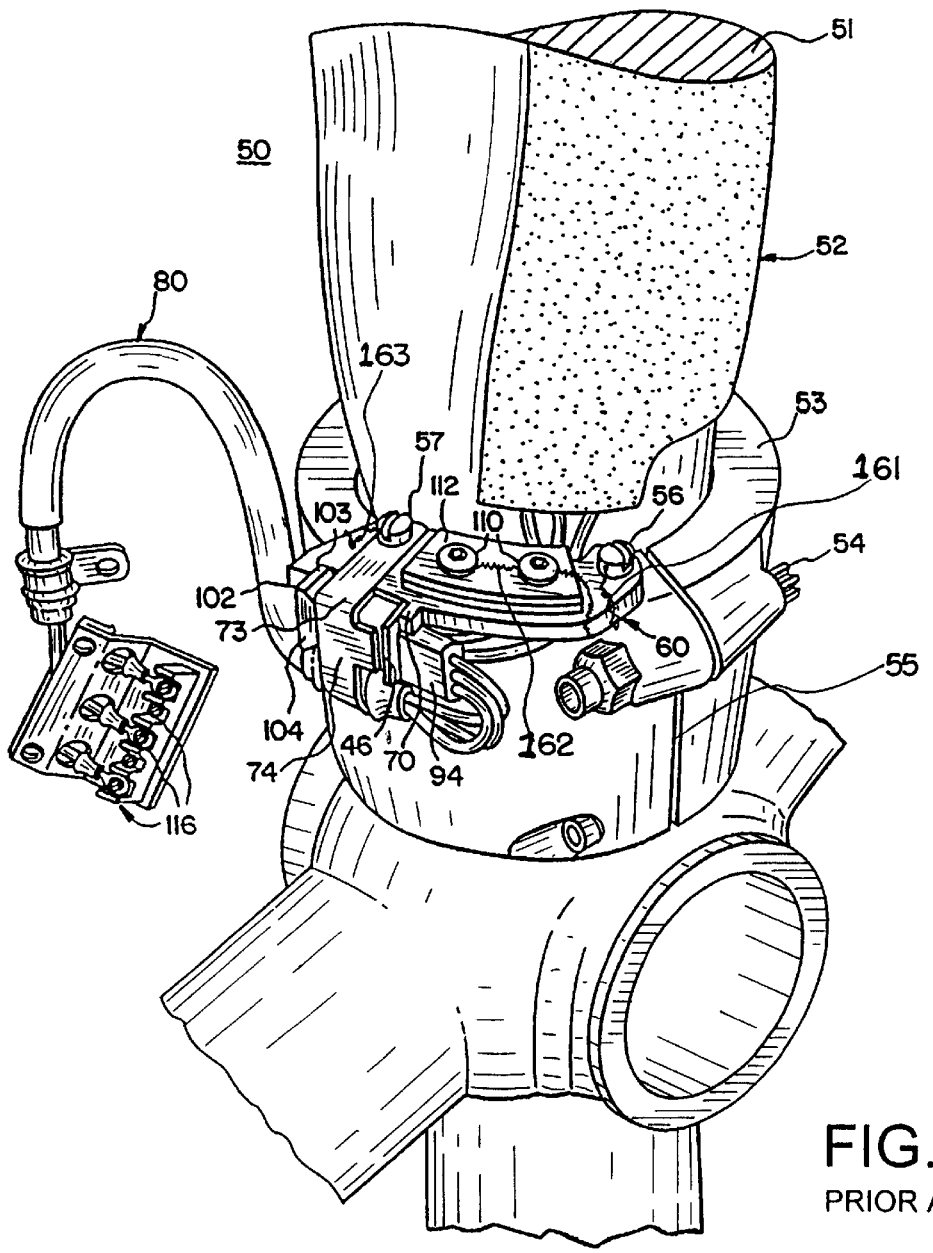
FIG. 5 is a partial perspective view showing a propeller and hub with a deicer boot installed with a prior art bracket.
Figure 6:
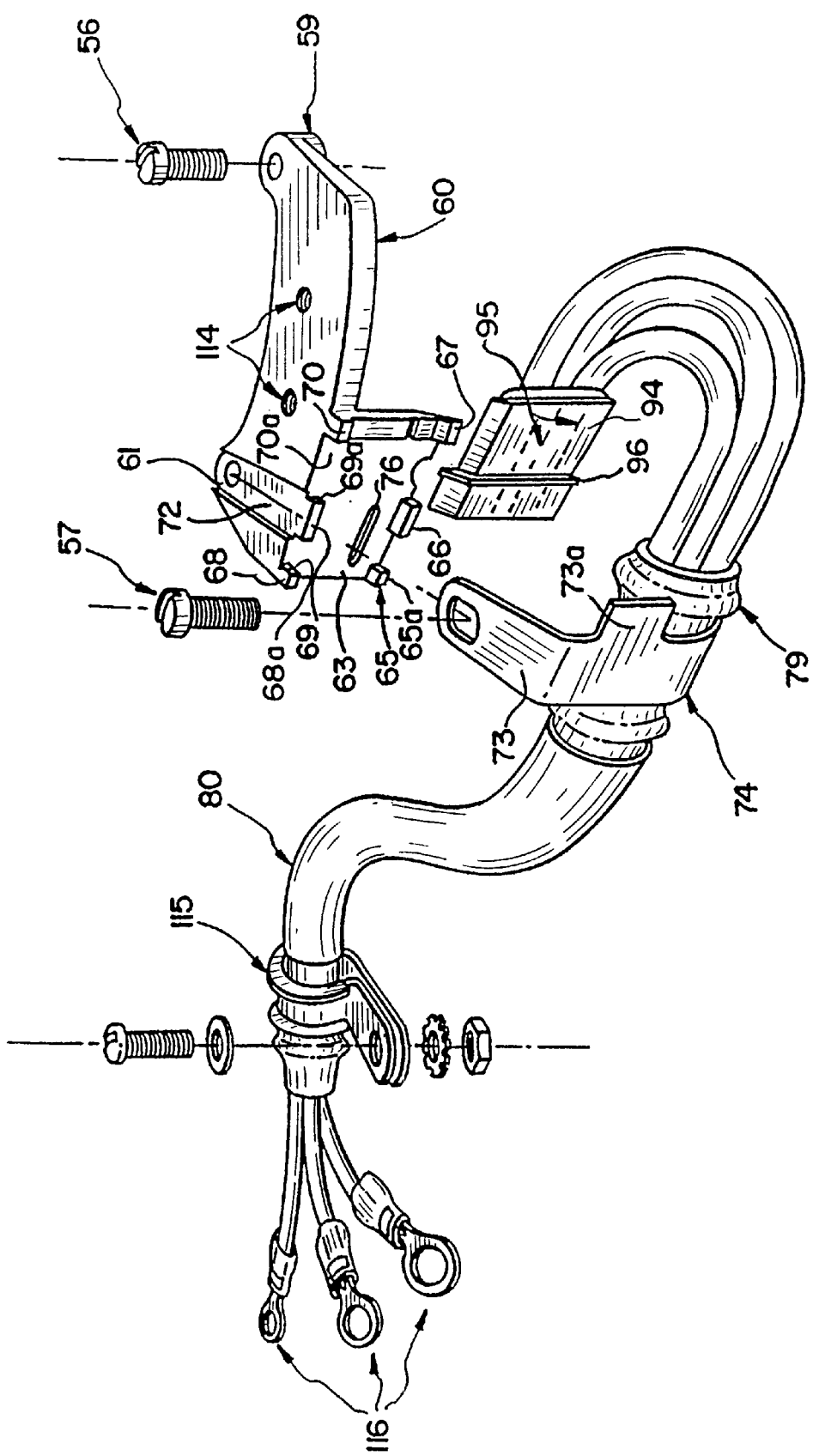
FIG. 6 is an exploded perspective view of prior art harness assembly showing the details of the connector and clip assembly.
Figure 8:
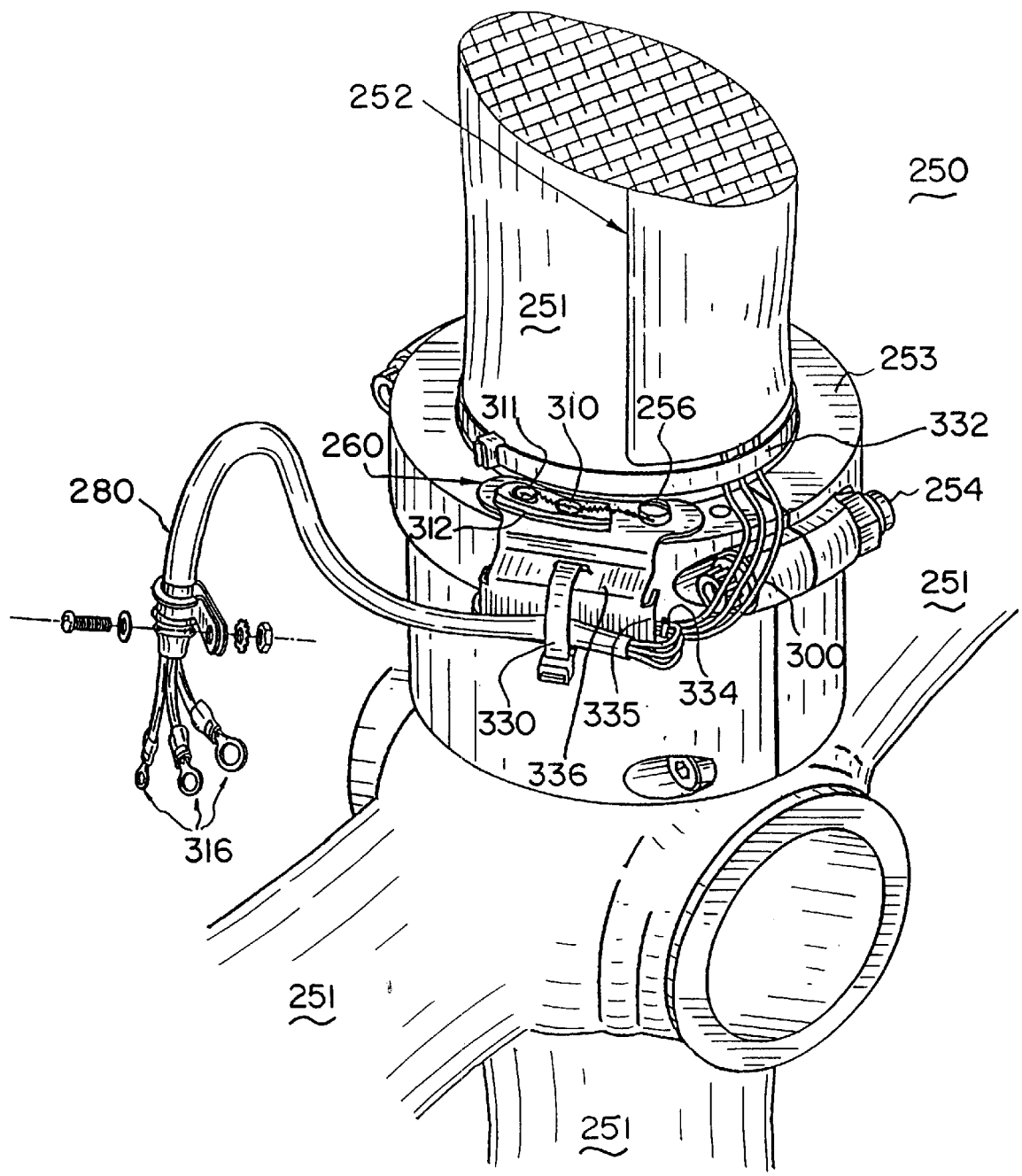
FIG. 8 is a partial perspective view showing a propeller and hub with a deicer boot installed with a bracket in accordance with the present invention.

Turning to FIGS. 4, 5, and 6 which should be viewed together, there is shown an alternative prior art propeller blade assembly generally designated 50, an assembly made up of a plurality of individual propeller blades 51, each of which is provided with an electric resistance heater deicer 52 and which is mounted in a hub 53, such hub being generally of a split 55 collar nature secured in its desired position by the fastener 54. The details of the hub and its relationship to the individual propeller blade, many of which blades have adjustable attack angles to vary the pitch of the propeller is not of importance to the invention but rather is typical of the prior art propellers, the propeller of the instant invention being illustrated for convenience in connection with a four-blade construction (portions removed). As with the prior art constructions, a bracket 60 having a general function similar to that of the bracket 12 of FIG. 2 is secured to the propeller hub by the threaded fasteners 56 and 57. A suitable boss or mounting surface 59 is provided adjacent to each of the mounting holes 61 thereby to elevate or position the bracket 60 is spaced relationship above the collar 55 in final assembly. Bracket 60 is provided with a downwardly extending wall 63 which is positioned, when the bracket is mounted on the propeller hub, in close proximity to propeller hub 53. On the lower edge of wall 63 are projections 65, 66 and 67 and along its upper surface there are provided the projections 68, 69 and 70. The projection 69 is a continuation of the groove 72 formed in the top surface of the bracket 60, which groove accommodates arm 73 of the mounting clip 74, arm 73 being provided with an aperture that mates with the aperture 61 in the mounting bracket so as to be secured in position by the fastener 57 (which serves to mount the bracket to the propeller hub). The lower wrapped-around free end portion (not shown) of clip 74 is received in a recess in the back (not shown) of bracket 60 thereby to form a mounting means for the connecting cable 80, extending from the propeller power supply, when the bracket 60 is assembled to the hub. A positioning and wear-resistant sleeve 79 can be provided on cable 80, which sleeve is engaged by the mounting clip 74, thereby trapping that portion of the cable in position on clip 74. The three wires making up the cable 80 extend to a connector element 94 and engages suitable terminals (dotted lines 95) for establishing connection to the propeller deicer connections (see FIG. 4). Connector 94 is provided with an outwardly extending ridge or abutment 96 which engages the face 70a of the projection 70 and the face 69a of the projection 69 and similar faces on projections 66 and 67 so as to be trapped and locked in position.

As seen in FIGS. 4 and 5, the wires 100 coming from the conventional resistance heater 52 also extend to a connector 102 which is configured in any suitable way to mate with the connector 94 to establish mechanical and electrical connection therewith. Connector 102 is provided with projecting wings 103 and 104 which engage the projections at 68 and 69 and, when assembled, engage an edge 73a of bracket 73 thereby to rigidly and firmly trap connectors 102 and 94 in assembled relationship on bracket 60 to establish electrical conducting contact while at the same time being rigidly affixed to the bracket 60 by arm 73 of clip 74 such that the connectors cannot be separated unless the clip 74 is removed. Two additional threaded fasteners 110 are shown as fastening weights 112 via the threaded receptacles 114 in the bracket to permit static and dynamic balancing of the assembled propeller blade, deicer heater and mounting brackets. Due to the position of receptacles 114, only one position is available for the mounting of the balance weights. The end of the cable which extends to the propeller power supply is provided with a suitable clamp 115 which can be fastened in any particular manner to a support surface so that terminals 116 can be connected to the power supply.

Safety wires 161, 162, 163 are threaded through holes in the fasteners 56, 110, 57 and the support bracket 60 to prevent the fasteners from backing out.

It can be seen that wires 100 are trapped under bracket 60 and in the space between bracket 60 and the propeller hub in order to effectively secure them in position and reduce strain on the connector 102. For deicer replacement, the bracket 60 has to be removed by removal of fasteners 56, 57. In addition, fasteners 56, 57 must be safety wired to bracket 60. Each deicer removal therefore requires removal and subsequent rewiring of the fasteners. Although it might appear otherwise, it is appreciated by those skilled in the art that removal of the fasteners, safety wires and bracket is not an easy task because these items are difficult to access and are easily lost so as to complicate the procedure of reinstalling a deicer, thereby significantly increasingly aircraft down time during a deicer replacement.

As previously mentioned, removal of the wiring harness that provides power to the deicer is also sometimes necessary. As seen in FIG. 6, removal of the harness 80 requires removal of fastener 57 (which also secures the bracket 60 to the hub), the problems of which being described before.

Referring now to illustration of the present invention in FIGS. 8–11 wherein like reference numerals designate like or corresponding parts throughout different views and wherein the drawings should be viewed together when considering the description and construction of the preferred embodiment, there is shown a propeller blade assembly generally designated 250 made up of a plurality of individual propeller blades 251, each of which is provided with an electrothermal, or electric resistance heater deicer 252 and which is mounted in a hub 253, such hub being generally of a split collar nature secured in its desired position by a fastener 254. The details of the hub and its relationship to the individual propeller blade, many of which blades have adjustable attack angles to vary the pitch of the propeller is not of importance to the invention but rather is typical of the prior art propellers, the propeller of the instant invention being illustrated for convenience in connection with a four-blade construction (portions removed). A bracket 260 is secured to the propeller hub by threaded fasteners 256, 310, 311. A suitable mounting surface is provided adjacent to each of the mounting holes 262, 263, 264 thereby to position and secure the bracket 260 on the hub 253.

Bracket 260 can be described as having a tongue portion 261 which is mounted to the hub 253, and a carriage or seating portion defined by a downwardly extending projection or wall 265 which is positioned in spaced apart relationship from the hub 253, and a pair of projections or tabs 266, 267 which extend perpendicular to the face of the downwardly extending projection 265 and towards the hub 253. The support bracket 260 can be formed integrally if it is machined (or cast) or stamped from a single piece of metal such as stainless steel or aluminum. The wall 265 and tabs 266, 267 form or define a three sided carriage portion(or housing, mount or enclosure) to receive for a pair of mated or engaged connectors 294, 302 and a connecting cable 300. The carriage limits movement of the mated connectors and holds them in position on the hub relative to the deicer. Cable 300 extends from the bracket 260 to the deicer when the bracket 260 is assembled to the hub. If desired, a positioning and wear resistant sleeve (not shown) can be provided on cable 300. The three wires making up the cable 300 establish electrical connection to the propeller deicer. A connecting cable 280, extends from the propeller power supply terminals 316 to a connector 294. Connectors 294 and 302, when mated together engage with the face 259 of the projection 265 and similar faces on projections 266 and 267 so as to be trapped and limited in motion.

A slot, or aperture 336 is provided in bracket 260. An adjustable, flexible strap 330 with an adjustable, tightening, self connecting or locking mechanism is inserted through the opening 336 and wrapped around the mated connectors 294, 302 and cable 280 and tightened and locked to thereby secure the connectors and cable in place.

Connector 294 has terminals provided within, with each terminal corresponding and connected to a source or lead wire within wire bundle 280 which terminate at terminals 316. Connector 302 has terminals provided within that correspond to each one of the wires in bundle 300, which are connected to the electrical resistance heating element (not shown) of deicer 252. The connectors 294, 302 are configured in a suitable way to mate with each other to establish mechanical and electrical connection therewith for providing electrical power from terminals 316 to deicer 252. To this end, connectors 302, 294 have protrusions and recesses that form a mechanical lock to thereby rigidly and firmly trap connectors 302 and 294 in assembled relationship to each other, and to establish electrical conducting contact while at the same time being rigidly affixed to the bracket 260 by tightened strap 330, such that the connectors cannot be separated unless the strap 330 is removed.

It is to be appreciated that the carriage portion of the support bracket forms a seat for receiving and holding the mated connectors. The mated connectors are further secured by use of a flexible strap. Other carriage configurations not specifically shown herein are within the contemplation of the present invention. What is important is that the carriage portion be configured so as to allow the use of a tie strap to wrap around the mated connectors and secure them within the carriage portion. The carriage portion should also be configured to facilitate easy removal of the mated connectors once the strap has been removed. Another important distinction of the present invention is that the carriage portion is positioned about the approximate center of the support bracket. A centered carriage portion makes the support bracket approximately symmetrical about the center. An approximately symmetrical support bracket can be utilized for propeller blades that rotate either clockwise or counter clockwise because the carriage is approximately equidistant from either end of the bracket and the deicer leads can therefore reach the bracket on either side of the hub.

Figure 9A:
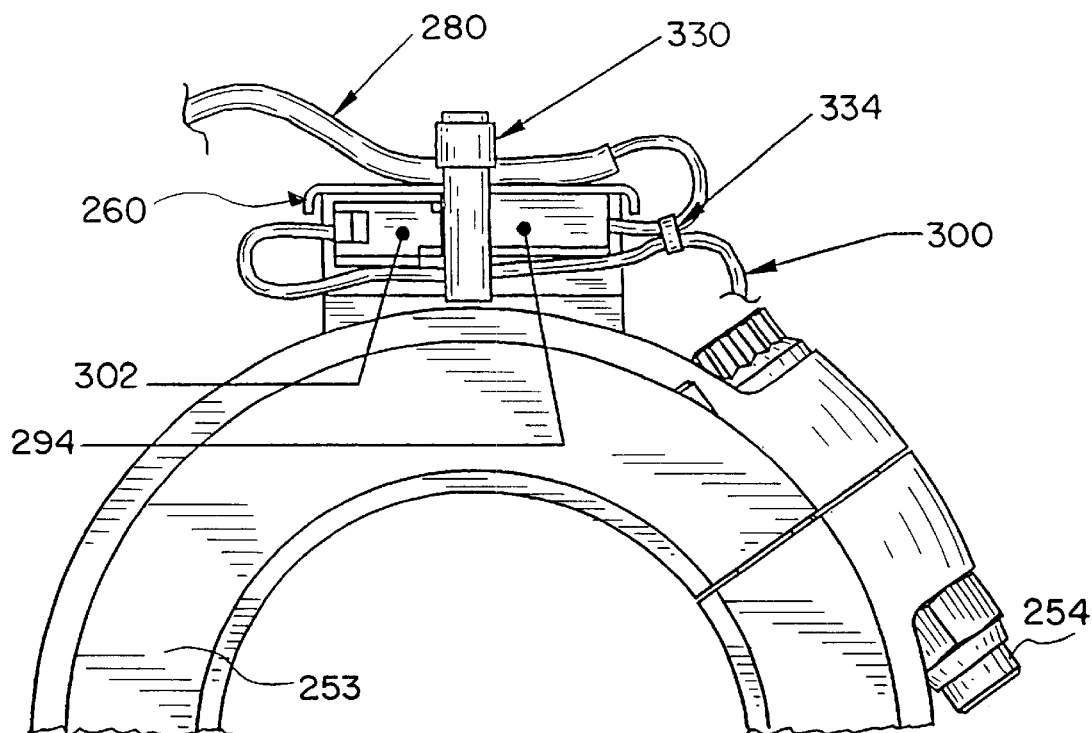
FIG. 9a is a partial bottom view of a hub with a bracket installed for a right hand rotating propeller in accordance with the present invention.
Figure 9B:
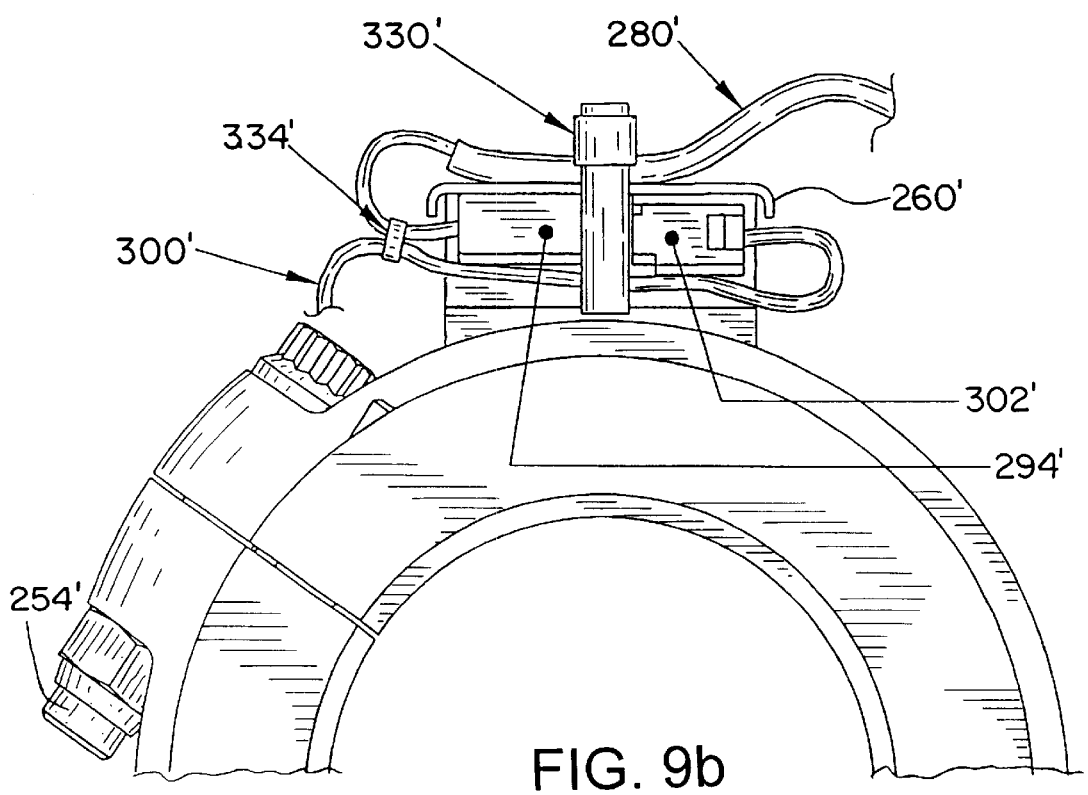
FIG. 9b is a partial bottom view of a hub with a bracket installed for a left hand rotating propeller in accordance with the present invention.
Figure 10C:
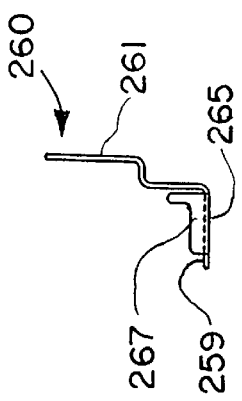
FIGS. 10a–10c are plan views of a bracket in accordance with present invention.
Figure 10B:
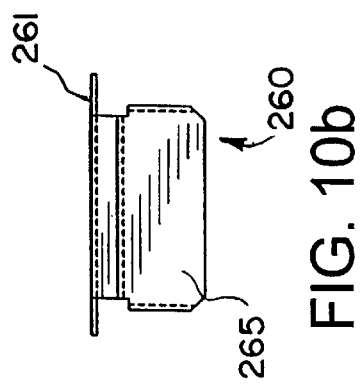
Figure 10A:
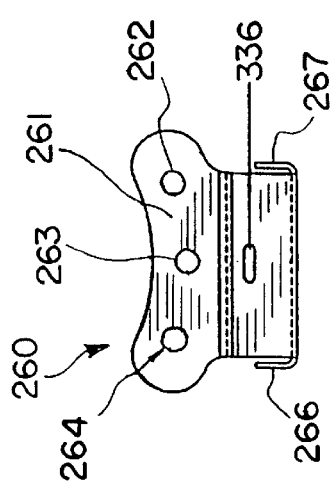

It is to be further noted that the tongue portion and mounting hole 262, 263, 264 arrangement of the support bracket is also configured to be approximately symmetrical about the center of the bracket. This arrangement provides a convenient platform for balancing the propeller with weights 312. In addition, the approximate symmetry of the holes facilitates use of the bracket on either side of the hub. FIGS. 9a, 9b. illustrate brackets which are mounted on different sides of a hub. It is appreciated from FIG. 8 that the symmetry of the bracket 260 about its center facilitates utilization of the bracket as shown in FIGS. 9a, 9b. Other mounting hole configurations, (such as two or four or more holes) however, could be utilized.

A strap 332 is also disposed or wrapped around the deicer lead wires and the base of the respective propeller and blade and tightened and locked to further secure and restrain the deicer lead wires 300.

Another strap 334 is disposed around both the deicer lead wires 300 and the source lead wires 280 near the bracket wire exit point 335 and between the bracket exit point 335 and the hub 253 and tightened and locked to further secure and restrain wires 280 to wires 300.

It is therefore appreciated that straps 332 and 334 restrain the deicer system electrical wires in such a way as to permit sufficient movement thereof and prevent flexing which would impose stress points in the wire and cause premature fatigue.

Heretofore, and as shown in FIG. 5, the wires exiting the deicer were routed between the support bracket and the hub for this purpose. Routing the wires this way necessitated removal of the bracket for deicer replacement. With the present invention wiring configuration, neither the source leads 280 or the deicer leads 300 need to be routed such that bracket removal is required for part replacement.

Figure 12:
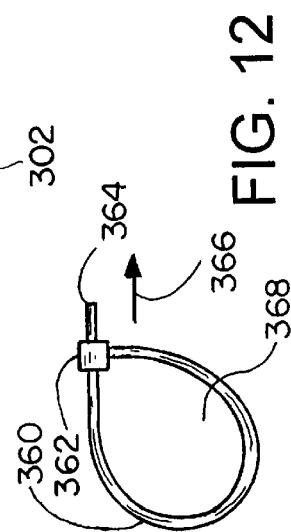
FIG. 12 is a side view of a strap member in accordance with the present invention.

Referring now specifically to FIG. 12, preferable straps 330, 332 and 334 for the present invention are known as plastic tie straps and are typically used for bundling wire harnesses in industrial applications. The preferred tie straps are commonly specified by Mil. Spec. MS3367. The straps are typically a flexible plastic strap member 360 and a head member 362. The strap member 360 has slanted grooves provided therein. The head member 362 has a slot provided therein for receiving the end 364 of the strap member 360. Within the slot of the head member 362 is a ratchet type mechanism which permits movement of the strap member through the slot in only one direction, illustrated by an arrow 366. For operation, the end 364 is pulled through the head 362. The further the end is pulled away from the head, the smaller the hole 368 created by the looped strap. Since the ratchet mechanism will not permit movement of the end 364 towards the head, the strap provides an adjustable tightening mechanism. Such flexible straps are easily removed by cutting or breaking with an appropriate tool. Use of a tie strap is preferable because tie straps are flexible, cuttable with a simple tool, and self connecting and locking in that no additional hardware is required to tighten and lock the strap around the wires. Other tightening, locking mechanisms, however, are within the purview of present invention although other such mechanisms might increase the complexity of the system.

Figure 11:
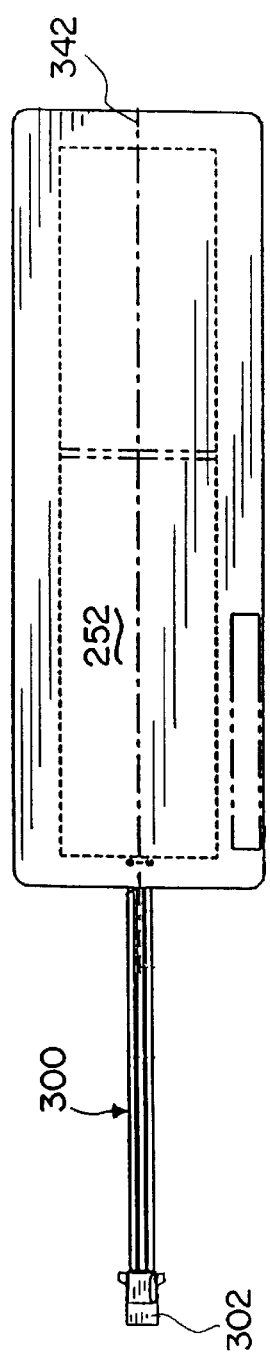
FIG. 11 is a plan view showing the terminals and the body of a propeller deicer in accordance with the present invention.

It is to be further appreciated that the present electrical connection configuration facilitates a deicer which has its exiting wires 300 located at or near the deicer centerline 342. A deicer with centerline exit wires is best shown in FIG. 11. An advantage for the present system is that identical deicers can be provided for propeller blades which revolve in both the clockwise or counter clockwise direction, thereby eliminating the need to carry different deicer and hardware sets for counter rotating propellers.

The threaded fasteners 310, 311 are shown as fastening weights 312 to the bracket 260 and hub 253 to permit static and dynamic balancing of the assembled propeller blade, deicer heater and mounting brackets. Weights can be attached in two positions between the set of three screws.

For removal of a deicer from a propeller blade, the end of the power network can be left connected while the straps 330, 332 are removed (as by cutting). Removal of the straps thereby frees the mated connectors 294, 302 and wires 280, 300. The connectors can then be disconnected and the deicer and straps 330, 332 are replaced. It can be seen that wires 280, 300 are not trapped under any brackets which have to be removed during a deicer replacement. Strain on the wires and connectors is reduced by utilizing straps 332, 334, which are easily removed and replaced.

Referring now specifically to FIGS. 9a, 9b, a connection scheme for a right hand rotating propeller is shown in FIG. 9a. In FIG. 9a, a support bracket 260 has a carriage portion which holds a pair of mated connectors 294, 302. A flexible strap having an adjustable, tightening mechanism for locking the mated connection in place.

A connection scheme for a left hand rotating propeller is shown in FIG. 9b. In FIG. 9b, a support bracket 260' has a carriage portion which holds a pair of mated connectors 294', 302'. A flexible strap having an adjustable, tightening mechanism for locking the mated connection in place.

It can be seen in FIGS. 9a and 9b that the bracket of the present invention can be used on either side of the hub fastener 254, 254' because the carriage portion of the support bracket remains approximately equidistant to the hub fasteners for mounting holes (not shown) which are equidistant to the fastener for both configurations.

Referring now specifically to FIG. 11, it can be seen that a deicer for utilization with the present connection system may have its power supply wires 300 exiting on or about the deicer centerline. Prior art deicers, such as those shown in FIGS. 7a–7e were required to exit offset of the centerline 120a–120e in for wire proximity to the prior art supporting bracket 60. In the present invention, it is not necessary to have the deicer wires 300 routed under the supporting bracket 260. Elimination of this requirement has succinct advantages. As mentioned, it permits improved flexibility which allows centerline deicer exit wires. Also, it is no longer necessary to remove the support bracket when replacing the deicer. Removal of the support bracket is difficult because the securing hardware is not easily accessible. Furthermore, removal of the support bracket requires removal of the balancing weights. With the present invention, the balancing weights do not have to be disturbed for deicer replacement.

In addition, it is no longer necessary to supply different deicer replacement kits for blades which revolve in either direction, since the bracket and deicer are symmetrical about each respective centerline. What is meant by symmetrical for the deicer 252 is that the deicer has protruding wires that are not offset or that they are near enough to the deicer centerline such that the deicer can be used on propeller blades that revolve both clockwise and counterclockwise, depending on the particular aircraft. The symmetrical support bracket is configured such that the bracket is suitable for use on either side of the propeller hub, depending on the rotation of the propeller. For exemplary purposes, it can be seen in FIG. 5 that prior deicers and support bracket assemblies are not symmetrical in this way. If the blade shown in FIG. 5 were to revolve in the opposite direction, the support bracket would have to be located on the other side of the centerline 55 of the hub. This would necessitate a bracket and deicer configured as a "mirror image" of that shown. The present invention eliminates this requirement.

When comparing the prior assemblies of FIGS. 1–7e with the present invention shown in FIGS. 8–11, it is clear that significant simplicity has been achieved while enhancing the durability and rigidity of the mounting structure for the energization of a propeller blade deicer element and that such simplicity greatly enhances the ability of unskilled mechanics to make the needed connections in a facile manner.

Although the invention has been illustrated and described with respect to exemplary embodiments thereof, it should be understood by those skilled in the art that the foregoing and various other changes, omissions and additions may be made therein and thereto, without departing from the spirit and scope of the invention.

What is claimed is:

1. A system for electrically connecting deicer leads extending from an electrical resistance heater propeller blade deicer to source leads connected to an electrical power source, the propeller being mounted on a hub, the system comprising:

(a) a first connector having separate electrical terminals for each of the deicer leads;

(b) a second connector having separate electrical terminals for each of the source leads;

wherein the first and second connectors are mated together to form a mated connection to provide electrical power to the deicer;

(c) a support bracket having: a tongue for attachment to the hub; projections configured to define a carriage portion for receiving the mated connection and limiting movement thereof; and an aperture provided in the support bracket; and, (d) a first flexible strap having an adjustable, tightening, locking mechanism, wherein the flexible strap is inserted through the aperture, around the mated connection, tightened and locked to secure the mated connection in position on the hub relative to the deicer, the flexible strap being removable to permit disassembly of the connector members and to permit replacement of the deicer or deicer source leads.

2. A system in accordance with claim 1, further comprising a second flexible strap having an adjustable, locking mechanism for tightening around the propeller blade and deicer leads to secure the deicer leads to the propeller blade.

3. A system in accordance with claim 1, further comprising a second flexible strap having an adjustable, locking mechanism, for tightening around the source leads and deicer leads to secure the source leads and deicer leads together to minimize fatigue thereof.

4. A system in accordance with claim 1, wherein the deicer leads extend from the deicer about the centerline of the deicer.

5. A system in accordance with claim 1, wherein the first flexible strap is plastic.

6. A system in accordance with claim 1, wherein removal of the first flexible strap is achieved by breaking thereof.

7. A method of electrically connecting deicer leads extending from an electrical resistance heater propeller blade deicer to source leads connected to an electrical power source, the propeller being mounted on a hub, the deicer leads having a first connector having separate electrical terminals for each of the deicer leads and the source leads having a second connector having separate electrical terminals for each of the source leads, the method comprising:

a) mating the first and second connectors together to form a mated connection to provide electrical power to the deicer;

b) disposing the mated connection in a support bracket having: a tongue for attachment to the hub; projections configured to define a carriage portion for receiving the connection and limiting movement thereof; and an aperture provided in the support bracket;

c) inserting a first flexible strap having an adjustable, tightening, locking mechanism through the aperture, around the mated connection; and, d) tightening and locking the first flexible strap to secure the mated connection in a fixed position on the hub relative to the deicer.

8. A method in accordance with claim 7, further comprising the step of disposing a second flexible strap having an adjustable, tightening, locking mechanism around the propeller blade and deicer leads to secure the deicer leads to the propeller blade.

9. A method in accordance with claim 7, further comprising the step of disposing a second flexible strap having an adjustable, tightening, locking mechanism around the source leads and deicer leads to secure the source leads and deicer leads together to minimize fatigue thereof.

10. A method in accordance with claim 7, wherein the deicer leads extend from the deicer about the centerline of the deicer.

11. A method in accordance with claim 7, wherein the first flexible strap is plastic.

12. A method in accordance with claim 7, further comprising the step of breaking the first flexible strap to replace the deicer.

13. A system for deicing a propeller blade which is mounted on a hub, the propeller blade having electrical power available at a terminal, the system comprising:

(a) an electrical resistance heater propeller blade deicer having electrically connecting deicer leads extending therefrom;

(b) source leads connected to the terminal;

(c) a first connector having separate electrical terminals for each of the deicer leads;

(d) a second connector having separate electrical terminals for each of the source leads;

wherein the first and second connectors are mated together to form a mated connection to provide electrical power to the deicer;

(e) a support bracket having: a tongue for attachment to the hub; projections configured to define a carriage portion for receiving the mated connection and limiting movement thereof; and an aperture provided in the support bracket; and, (f) a first flexible strap having an adjustable, tightening, locking mechanism, wherein the flexible strap is inserted through the aperture, around the mated connection, tightened and locked to secure the mated connection in position on the hub relative to the deicer, the flexible strap being removable to permit disassembly of the connector members and to permit replacement of the deicer or deicer source leads.

14. A system in accordance with claim 13, further comprising a second flexible strap having an adjustable, locking mechanism for tightening around the propeller blade and deicer leads to secure the deicer leads to the propeller blade.

15. A system in accordance with claim 13, further comprising a second flexible strap having an adjustable, locking mechanism, for tightening around the source leads and deicer leads to secure the source leads and deicer leads together to minimize fatigue thereof.

16. A system in accordance with claim 13, wherein the deicer leads extend from the deicer about the centerline of the deicer.

17. A system in accordance with claim 13, wherein the first flexible strap is plastic.

18. A system in accordance with claim 13, wherein removal of the first flexible strap is achieved by breaking thereof.

* * * * *

UNITED STATES PATENT AND TRADEMARK OFFICE
CERTIFICATE OF CORRECTION

PATENT NO.    : 6,358,006 B1
DATED         : March 19, 2002
INVENTOR(S)   : Weyandt, Scott Edward and Garcia, Gary Gene It is certified that error appears in the above-identified patent and that said Letters Patent is hereby corrected as shown below:

<u>Title page,</u>
Insert Item [73], Assignee, below Item [75]:
-- [73]  Assignee Name:  B.F. Goodrich Company, The
                         Charlotte, North Carolina --

Signed and Sealed this

Twenty-second Day of October, 2002

*Attest:*

JAMES E. ROGAN
*Attesting Officer*        *Director of the United States Patent and Trademark Office*